Dec. 12, 1961  B. L. PENNER  3,012,814
COVER AND DECK STRUCTURE FOR PICK-UP TRUCKS
Filed Nov. 14, 1958  2 Sheets-Sheet 1
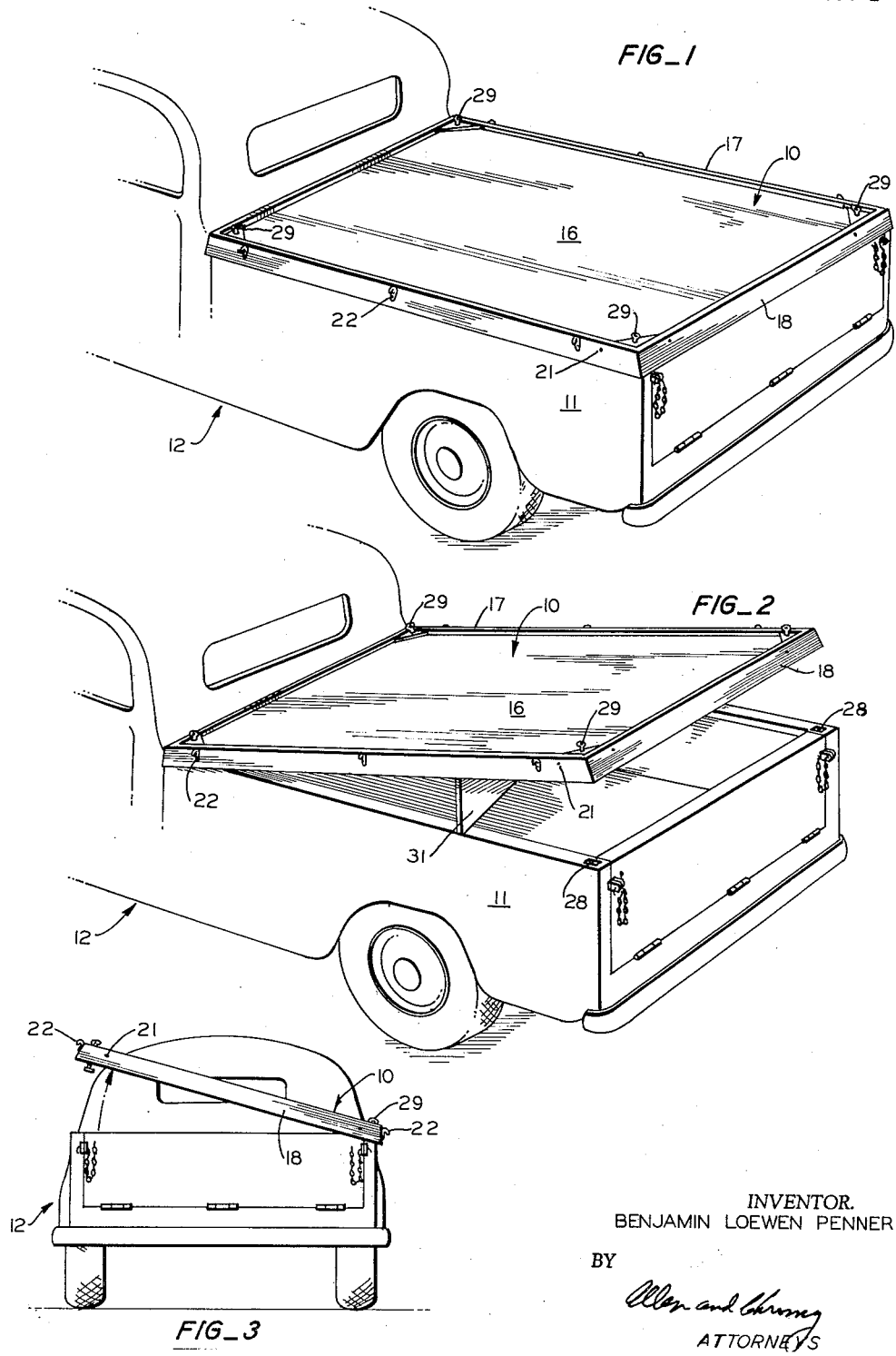
INVENTOR.
BENJAMIN LOEWEN PENNER
BY
ATTORNEYS Dec. 12, 1961 B. L. PENNER 3,012,814
COVER AND DECK STRUCTURE FOR PICK-UP TRUCKS
Filed Nov. 14, 1958 2 Sheets-Sheet 2
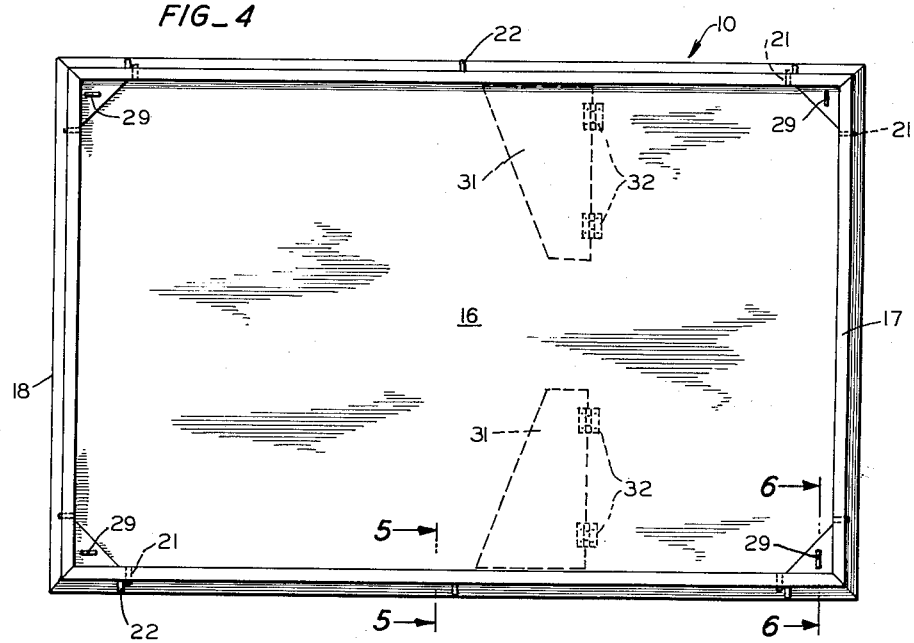
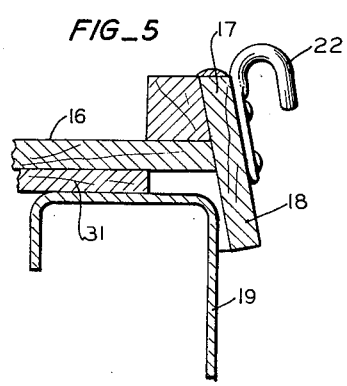 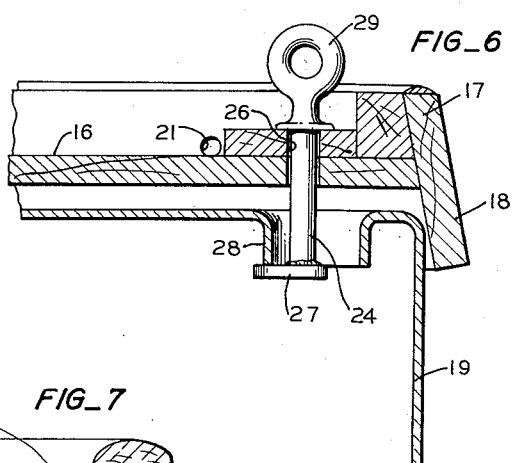
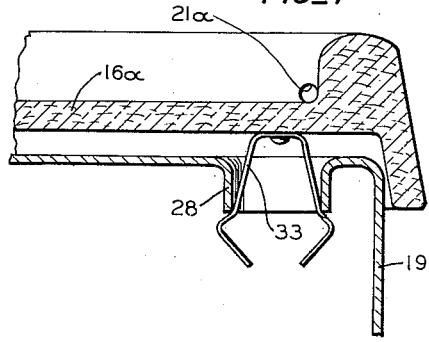
INVENTOR.
BENJAMIN LOEWEN PENNER
BY
ATTORNEYS

United States Patent Office 3,012,814
Patented Dec. 12, 1961

3,012,814
COVER AND DECK STRUCTURE FOR
PICK-UP TRUCKS
Benjamin Loewen Penner, 348 Johnson Ave., Los Gatos,
Calif., assignor of forty-nine percent to Evert J. Amick,
Los Gatos, Calif.
Filed Nov. 14, 1958, Ser. No. 773,935
2 Claims. (Cl. 296—100)

The present invention relates to a pick-up truck construction including an accessory cover and deck structure for such trucks which provides a load carrying rain tight closure for the bed of the truck, and also provides for ready access to the interior of the truck.

Pick-up trucks are widely used by many occupations and businesses for transporting tools to and from the job, but have heretofore had the disadvantage that the tools have been open to the weather or accessible for stealing when the owner is not present.

The present invention has for its principal object the provision of a cover and deck member for the bed of a pick-up truck which will obviate the foregoing disadvantages.

Another object of the invention is to provide a cover and deck member of simple construction which can be readily lifted from either side or from the rear thereof to provide access to material within the bed of the truck.

Other objects and advantages of the invention will be apparent from the following description of a preferred embodiment thereof as illustrated in the accompanying drawings in which:

FIGURE 1 is a perspective view of a pick-up truck with a cover and deck member in its closed or lowered position;

FIGURE 2 is a perspective view similar to FIGURE 1 but showing the cover and deck member raised for access to the bed of the truck from the rear thereof;

FIGURE 3 is a rear elevational view of the member with one side raised;

FIGURE 4 is a plan view of a cover and deck member embodying this invention;

FIGURE 5 is a fragmentary detail view illustrating certain details of construction, and taken as illustrated by the line 5—5 in FIGURE 4;

FIGURE 6 is a fragmentary sectional view taken as indicated by the line 6—6 in FIGURE 4;

FIGURE 7 is a fragmentary sectional view similar to FIGURE 6 but illustrating a modified construction.

Referring to the drawings, the cover and deck member of the instant invention is illustrated generally at 10, being shown in FIGURE 1 in place on the bed 11 of a pick-up truck 12. The cover and deck member 10 includes a central panel 16 which is preferably flat and of sufficient strength to support the weight of a man and the weight of a load carried on the cover and deck member. At the edges of the panel 10 there is provided a raised rib 17 extending around the four sides of the cover and deck member 16, and having an outer flange or flange structure 18 which projects downwardly in overlapping relation with the adjacent side wall 19 of the bed 11. About the periphery of the panel 16, a plurality of drain holes 21 are provided for drainage of water from the central panel 16 and discharging it outside of the truck bed 11. About the periphery of the panel 16 and attached to the rib 17 are provided a plurality of hooks 22 for the attachment of lines in securing a load in place.

Releasable fastening means are provided at the four corners of the cover and deck member and this may take the form of a fastening bolt 24 (FIGURE 6) slidably mounted in an aperture 26 of the cover and deck member and provided at its lower end with a projecting ear 27 welded thereto to engage under the flange 28 of a conventional post receiving hole of the pick-up truck. At its upper end the fastening bolt 24 has an eye or handle member 29.

Means are provided for selectively holding the cover deck member in raised position from either side thereof or from the rear, and for this purpose a pair of trapezoidal support elements or brackets 31 are connected by aligned hinges 32 (FIGURE 4) to the underside of the central panel 16, and when the cover is raised by grasping at the edge either from the rear or from either side, both or one of these support elements or brackets 31 will swing downwardly to engage the adjacent wall 19 of the truck bed and maintain the cover and deck member supported while the workman has access to the interior of the truck.

FIGURE 7 illustrates a modified construction wherein the cover and deck member is molded of a plastic reenforced with fiber glass, and also incorporating a different type of releasable fastening means at each of the corners. The panel member 16a of FIGURE 7 is an imperforate, as the spring type double leaf fastener 33 is secured to the underside thereof and does not require a fastening hole. Also, the drainage apertures 21a are located at the corners of the deck and cover member.

While I have shown and described a preferred form of the invention, it will be apparent that the invention is capable of variation and modification from the form shown, so that its scope should be limited only by the proper scope of the claims appended hereto.

I claim:

1. A load-carrying cover and deck for the load carrying bed or compartment of a pick-up truck, said cover and deck being adapted to be open from the sides thereof as well as from the rear to permit access to said bed or compartment from said sides and rear and said cover and deck also being adapted to close the top of said bed or compartment in weather tight fashion, the improvement comprising a substantially rectangular panel of plastic reinforced with fiber glass, said panel having a flat load-carrying upper surface, a raised rib also formed of plastic reinforced with fiber glass and being integral with said panel, said raised rib extending around all four sides of said panel, an outer flange having the top portion thereof integral with the peripheral portions of said panel and extending downwardly and outwardly therefrom so as to encompass the outer top wall portion of the pickup truck bed, said outer flange also being formed of plastic reinforced with fiber glass, and a plurality of individually releasable fastening devices attached to the bottom surface of said panel for gripping said pick-up truck bed, said fastening devices being positioned on said panel and the inner surfaces of said outer flange being shaped such that said panel may be tilted and raised away from said pickup truck bed on any selected one of its two sides or front by releasing the holds of the ones of said fastening devices opposed to said selected side or front and raising said selected side or rear of said panel.

2. A load-carrying cover and deck comprising a substantially rectangular panel of plastic reinforced with fiber glass, said panel having a flat load-carrying upper surface, a raised rib also formed of plastic reinforced with fiber glass and being integral with said panel, said raised rib extending around all four sides of said panel, an outer flange having the top portion thereof integral with the peripheral portions of said panel and extending downwardly and outwardly therefrom so as to encompass the outer top wall portion of the pickup truck bed, said outer flange also being formed of plastic reinforced with fiber glass, and a plurality of individually releasable fastening devices attached to the bottom surface of said panel for holding the cover closed on the pickup truck bed, said fastening devices being positioned on said panel and the inner surfaces of said outer flange being shaped such that said panel may be tilted and raised away from said pickup truck bed on its front by gripping and raising the rear portion of said cover.

References Cited in the file of this patent

UNITED STATES PATENTS

| | | |
|---|---|---|
| 369,567 | Stevens | Sept. 6, 1887 |
| 375,113 | Youtsey et al. | Dec. 20, 1887 |
| 770,775 | Norris | Sept. 27, 1904 |
| 2,344,551 | Heinrich | Mar. 21, 1944 |
| 2,493,258 | Massare | Jan. 3, 1950 |
| 2,531,140 | Linde | Nov. 21, 1950 |
| 2,719,054 | Jennings | Sept. 27, 1955 |
| 2,822,213 | Smith | Feb. 4, 1958 |
| 2,886,375 | Crawford | May 12, 1959 |